Dec. 13, 1927.

H. L. COOKE

METHOD OF AND MEANS FOR PRODUCING DISTORTED IMAGES

Filed May 3, 1921  2 Sheets-Sheet 1

1,652,271

INVENTOR
H. L. Cooke
BY
ATTORNEYS

Dec. 13, 1927.

H. L. COOKE 1,652,271

METHOD OF AND MEANS FOR PRODUCING DISTORTED IMAGES

Filed May 3, 1921        2 Sheets-Sheet 2

INVENTOR
H. L. Cooke
BY
ATTORNEYS

Patented Dec. 13, 1927.

1,652,271

UNITED STATES PATENT OFFICE.

HEREWARD LESTER COOKE, OF PRINCETON, NEW JERSEY, ASSIGNOR TO COOKE PATENTS INCORPORATED, OF NEW YORK, N. Y., A CORPORATION OF DELAWARE.

METHOD OF AND MEANS FOR PRODUCING DISTORTED IMAGES.

Application filed May 3, 1921. Serial No. 466,488.

My invention relates to methods of and means for producing distorted images.

It is concerned particularly with bringing about distortion of images in some desired pre-determined manner, and in certain forms of its embodiments it contemplates the provision of means whereby the amount or direction of the distortion may be varied at will, so that the image may be caused to go through any desired course of changes in shape and assume a variety of unnatural aspects and humorous contortions. It proposes, moreover, to provide means whereby the changes from one aspect to another may be made gradual so that one shape will appear to grow into another.

Figure 1:
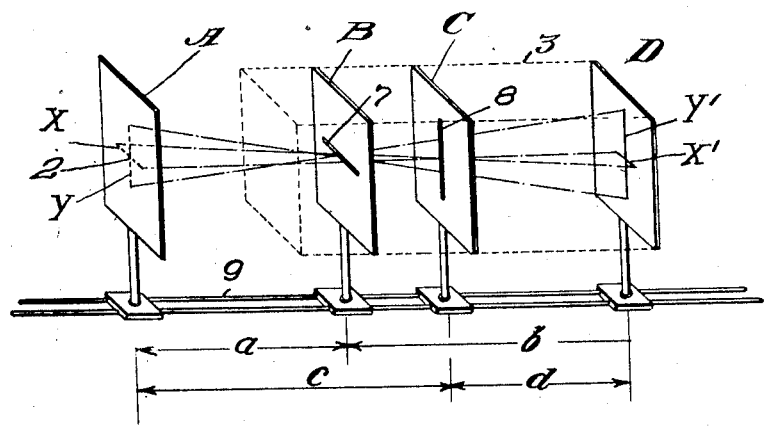
Figure 2:
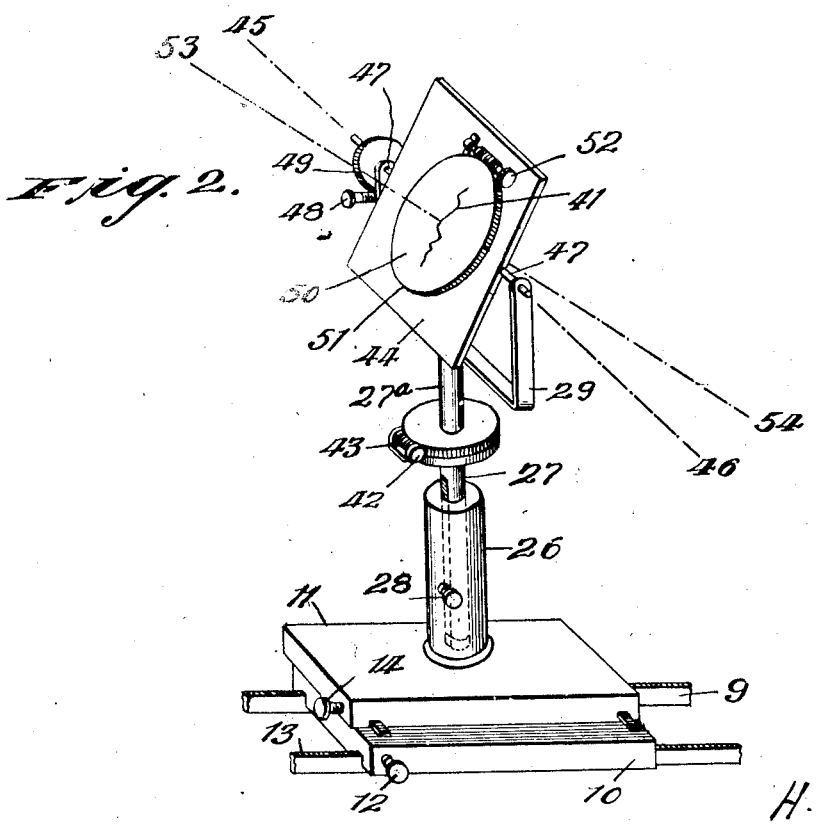
Figure 3:
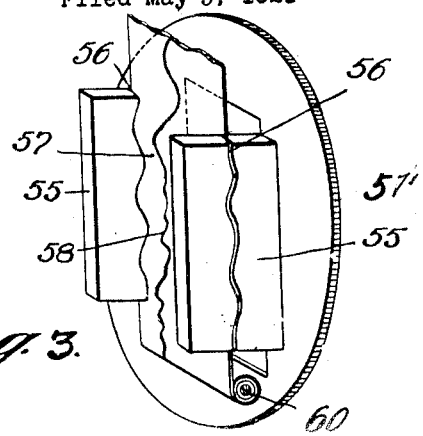
Figure 4:
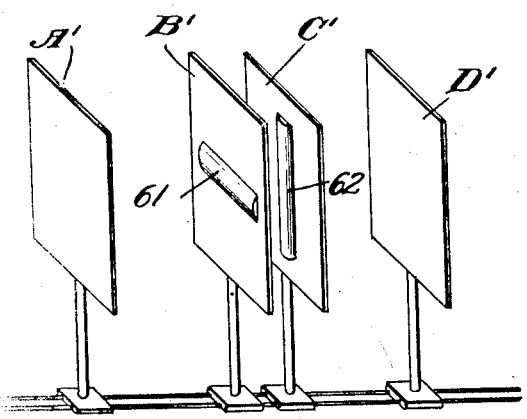
Figure 5:
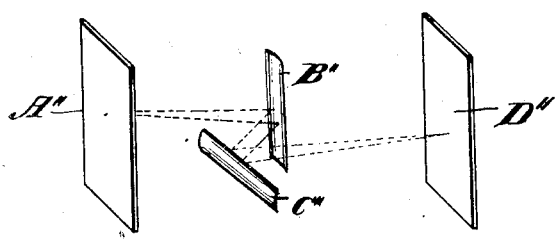

The invention may be applied in the arts for many different purposes, for example, for producing humorously distorted photographs or moving picture films in which the successive exposures are so distorted that the characters or objects will appear to change in size or shape when the film is projected on a screen in the regular manner. It may be employed, not only for obtaining distorted images, but also for the reverse effect, namely, for obtaining natural images from distorted pictures, this being accomplished by introducing a distortion of opposite or neutralizing character when the image is being made. Many other applications of the invention will readily suggest themselves from the following detailed descriptions of certain methods of practicing the invention and certain forms of apparatus embodying the same, reference being had to the accompanying drawings in which:

Figure 1 is a diagrammatic view useful for explaining the principles of the invention; Figure 2 is a perspective view illustrating in a more or less diagrammatic way the manner in which the screens B and C of Figure 1 may be mounted so as to permit freedom of adjustment thereof; Figure 3 is a perspective view showing provision for warping the screens B and C; and Figures 4 and 5 are diagrammatic views useful for explaining how the invention may be carried out by the use of cylindrical lenses or mirrors.

Similar characters of reference designate similar parts in each of the several views.

In Fig. 1 of the drawing reference character A designates an object of which it is desired to produce an image, this object being illustrated as a screen bearing a cross 2. Reference numeral 3 indicates a camera comprising a screen D, upon which the image is to be formed, and opaque screens B and C having narrow transparent slits 7 and 8 formed therein, these slits being horizontal and vertical, respectively. The screens are arranged to be movable relatively to each other, and for this purpose are upon stands slidable along a track 9.

The above described arrangement of apparatus serves to produce on screen D a distorted image of the cross 2, the manner in which the same is formed being as follows:

Rays from each point on screen A pass through slit 7 of screen B and form an image on screen C, this image being in the form of a horizontal line. At the intersection of this line and the slit 8 of screen C, the light from the object will be free to pass to screen D and form an image thereon. When, therefore, the slits are narrow, as assumed herein, each point of the object will produce a single point image on screen D, the position of this point being determined by the direction of the ray of light which is free to pass through both slits 7 and 8. All points in the same horizontal line, such as X of object A, will be produced in a horizontal line X' on screen D, the position of which line on the screen is governed jointly by the position of slits 7 and 8, but the length of which is entirely independent of said slit 7, being governed solely by the relative distance between screens A, C and D, in accordance with the relation.

$$\frac{X}{X'} = \frac{c}{d}$$

where X and X' are the lengths of the object and image lines, respectively, and c and d are the distances indicated in the drawing. Similarly, the position of the image Y' of line Y is governed by the position of both slits 7 and 8 relative to screens A and D, whereas the length of Y' is governed by the relative distances between screens A, B and D, in accordance with the relation:

$$\frac{Y}{Y'} = \frac{a}{b}$$

The scale of the image in a horizontal direction is thus governed by screen C and may be varied by shifting the position of this screen relative to A and D and the vertical scale of the image is governed by screen B and may be varied by movement of said screen. The scale in either direction may thus be changed without affecting the scale in the other direction, or it may be varied simultaneously in both directions by moving both screens B and C. The distortion of the image depends upon the ratio of the horizontal to the vertical scale, i. e., upon the value of $\frac{a}{b} \cdot \frac{d}{c}$.

If $\frac{a}{b} = \frac{c}{d}$, the above value is unity and there is no distortion. In this case the two screens are in the same plane so that the slits are reduced to the ordinary non-distorting pinhole.

Aside from the distortion entailed by the movements of the screens relatively to each other along the track 9, other distortions may be brought about by varying the angular direction of the slits, by distorting the slits proper, and by distorting the object and image screens or varying the relative spacial and angular positions thereof.

It will be apparent that practically any desired course of changes in the image on screen D may be effected by suitable changes in the parts of the apparatus.

In Fig. 2 is illustrated an elementary form of device whereby a slit such as 41 may be caused to assume any desired position, either spacial or angular, so that a complete freedom of adjustment thereof is possible. Reference numeral 9 designates the track on which a carriage 10 may be operated back and forth by means of a milled head 12 operating a rack and pinion mechanism of which only the rack 13 is illustrated. On top of carriage 10 is mounted another carriage 11 which may be moved at right angles to the direction of the rails by means of a second rack and pinion mechanism operated by the milled head 14. The upright tube 26, fastened rigidly to the carriage 11, has the tube 27 adjustably mounted within it so that the height thereof may be adjusted by means of the milled head 28 controlling a rack and pinion mechanism. A fork 29 is rigidly attached to the tube 27ª which extends into the upper end of tube 27 and may be rotated about its vertical axis by means of the milled head 42 which operates a tangent screw 43. The rectangular frame 44 is mounted for pivotal movement about a horizontal axis 45—46 by means of the trunnions 47 supported in the fork 29. The milled head 48 operating a tangent screw engaging with the periphery of the disk 49 fixed to one of the trunnions controls the rotation of the rectangular frame 44 about the horizontal axis 45—46. The slit screen 50 is mounted rotatably in the plane of frame 44 by means of the ring 51, and its angular position is controlled by means of the milled head 52 operating a tangent screw as shown. The rotation of the slit screen effected by means of the milled head 52 occurs about the axis 53—54 this axis for all adjustments remaining at right angles to the axis 45—46, but not necessarily remaining horizontal. It will be seen that this method of mounting the slit screen imparts to the said screen six degrees of freedom of motion, three linear and three angular, so that the slit may be brought into any desired position.

Still another adjustment, however, which may be found convenient consists in distorting the slit proper. For this purpose the slit screens are made of flexible material such as mica or other suitable transparent substance, so that the surface of the screen may be warped. Such an arrangement is shown in Fig. 3 in which blocks 55 have similar irregular slots 56 cut in them and a piece of mica 57 rendered opaque by a suitable coating with a transparent slit in it, such as 58, is slidably mounted in the slots 56. The blocks 55 are mounted in a ring 51', which may be substituted for the ring 51 of Fig. 2, so that the slit 58 may be displaced in a linear or angular manner.

The distortion of the slit may be varied by drawing the sheet of mica through the irregular slots 56 and winding the same on a spool 60, or by bending or deforming the blocks 55 themselves. Again, the blocks 55 may be arranged so that they have mounted on them irregularly or regularly placed rollers or cam wheels, which by suitable manipulation will change the warped form of the surface of the slit screen 57. Mechanism for carrying out these principles for mounting of the slit may be readily designed in the light of the present disclosure without demands on the inventive ability of the designer, and are therefore not described in detail.

It is thus obvious that by the arrangement described each slit may be changed in shape as well as in angular and spacial position so that when the screens are thus mounted and operatively associated in a camera, any desired distortion of the image and changes of distortion may be produced.

With regard to a practical method of making these slits, a convenient way will be to cover a sheet of suitable substance such as thin mica with an opaque coating and then to open up a narrow slit in this coating. Or a metal, such as silver or platinum, may be electrically deposited on the mica either by electroplating or by electrically "sputtering" the metal on the mica in a high vacuum by a well known process, a thin wire, either straight or bent, being placed in contact with the surface, so as to form a slit in the metallic coat thereon when the wire is removed. The sputtered part of the mica is subsequently covered by a nonreflecting coating such a dead black paint leaving the slit uncovered by said black paint. The width of the slit which will give best definition for any given relative disposition of the screens A, B, C, and D may be calculated by methods analogous to those employed in calculating the best diameter of pinhole in pinhole projection.

Instead of the slits, I may employ cylindrical lenses or mirrors, these devices being kindred to the slits in optical properties. As is well known, a cylindrical lens or a cylindrical mirror may be made to project a point into a line, so that the slits hereinbefore considered are optically similar to cylindrical lenses or mirrors which are either straight or bent according to whether the slits to which they correspond are straight or bent. The advantages of cylindrical lenses and mirrors over line slits are due to the fact that they will transmit more light from the object on to the screen just as a spherical lens or a spherical mirror will transmit more light than a pinhole. The limitations of the cylindrical lenses or mirrors are that the screens A and D must be arranged at the conjugate foci of said lenses or mirrors in order to get sharp definition of the image. The methods and means of calculation to be employed in replacing the slits hereinbefore considered by cylindrical lenses or mirrors are perfectly obvious and well known to anyone familiar with the principles of optics, the general arrangement for lenses being indicated roughly in Figure 4 in which screens A' and D' are at the conjugate foci of both cylindrical lenses 62 and 61 of screens B' and C' and in Figure 5, in which the screens A" and D" are at the conjugate foci of the cylindrical mirrors B", C". If the screens A and D in Figures 4 and 5 are not accurately at the conjugate foci of the cylindrical lenses or mirrors, the definition on the screen D may be improved by stopping down the width of the cylindrical mirrors or lenses just as an ordinary lens may be stopped down to obtain greater depth of focus.

In the appended claims the term linear optical device is employed to cover cylindrical lenses and mirrors as well as slits, the adjective "linear" being used to denote the characteristic common to all of these devices and which distinguishes them from spherical lenses or ordinary pinhole arrangements.

The practical applications of the invention are many. For example it may be employed for taking distorted photographs of objects in nature or for printing distorted positives from natural or orthographic negatives. Again, it may be employed for printing natural pictures from distorted negatives, by reversing, as it were, the paths traversed by the rays when the distorted image was made, so that the distortion is neutralized and disappears. This neutralization may be accomplished if desired in one stage or in several separate stages, each stage removing one of the component distortions of the original image.

The invention finds a very useful application in the motion picture field. Here it may be employed for printing a distorted positive film from a natural negative one or vice versa. For this purpose the negative or positive film is illuminated by diffused light, as through a piece of ground glass, and the positive or negative is printed or photographed from the negative or positive the distorting devices of this invention being substituted for the ordinary lenses or utilized in lieu of contact printing. The distortion may be changed in the manner hereinbefore described, and if the change is made progressively from picture to picture, the characters or objects will appear to change in form when the film thus made is projected on a screen. All imaginable distortions and humorous effects may thus be produced.

While I have illustrated and described my invention in connection with only a few embodiments thereof, it will be understood that I do not intend to limit myself to the specific embodiments shown, but that I intend to cover my invention broadly in whatever form its principle may be employed.

What I claim is:

1. In combination, an object, a plurality of optical devices for forming an image thereof, and means for gradually adjusting the relative positions of said devices and said object and its image in a plurality of directions and at a plurality of angles to permit of desired gradual distortion of said image.

2. In combination, an object, a plurality of optical devices for forming an image thereof, and means for gradually adjusting the relative positions of said devices in any direction and at any angle to permit of desired distortion of said image.

3. In combination, an object, a plurality of linear optical devices for forming an image thereof, and means for adjusting the relative positions of said devices and the said object and its image in any direction and at any angle to permit of desired distorting of said image.

4. In combination, an object, a plurality of linear optical devices for forming an image thereof and means for progressively warping at least one of said optical devices to distort the image.

5. In combination, an object, means for forming an image of said object and means including rotary holding means for gradually moving one point in the image relatively to another point thereof in any desired direction and to any desired distance.

In testimony whereof I have affixed my signature to this specification.

HEREWARD LESTER COOKE.